United States Patent [19]

Dekeyser et al.

[11] Patent Number: 5,066,095

[45] Date of Patent: Nov. 19, 1991

[54] JOINTING BOX FOR OPTICAL FIBER CABLES

[75] Inventors: Bernard Dekeyser, Dunkerque; Roland Troude, Calais, both of France

[73] Assignee: Alcatel Cable, Cedex, France

[21] Appl. No.: 652,711

[22] Filed: Feb. 8, 1991

[30] Foreign Application Priority Data

Feb. 9, 1990 [FR] France .................. 90 01535

[51] Int. Cl.⁵ .................................................. G02B 6/38
[52] U.S. Cl. ...................................... 385/99; 385/100; 385/135
[58] Field of Search ............... 350/96.2, 96.21, 96.22, 350/96.23, 96.29

[56] References Cited

U.S. PATENT DOCUMENTS

| | | | |
|---|---|---|---|
| 4,239,336 | 12/1980 | Parfree et al. | 350/96.23 |
| 4,290,668 | 9/1981 | Ellis et al. | 350/96.2 |
| 4,509,820 | 4/1985 | Murata et al. | 350/96.21 |
| 4,516,830 | 5/1985 | Guazzo | 350/96.22 |
| 4,699,462 | 10/1987 | Jones | 350/96.23 |
| 4,744,622 | 5/1988 | Cherry et al. | 350/96.2 |
| 4,753,499 | 6/1988 | Malkani et al. | 350/96.2 |
| 4,753,500 | 6/1988 | Guazzo | 350/96.2 |
| 4,773,729 | 9/1988 | Mignien | 350/96.21 |
| 4,793,684 | 12/1988 | Oppenländer | 350/96.23 |
| 4,813,754 | 3/1989 | Priaroggia | 350/96.23 |
| 4,976,508 | 12/1990 | Okura et al. | 350/96.23 |
| 5,009,474 | 4/1991 | Wurmser et al. | 350/96.20 |

FOREIGN PATENT DOCUMENTS

| | | |
|---|---|---|
| 0051109 | 5/1982 | European Pat. Off. . |
| 0066829 | 12/1982 | European Pat. Off. . |
| 2192732 | 1/1988 | United Kingdom . |

OTHER PUBLICATIONS

Patent Abstracts of Japan, vol. 11, No. 252 (P-605), Aug. 15, 1987; & JP-A-6256907 (NTT), 3/12/87.

*Primary Examiner*—Frank Gonzalez
*Attorney, Agent, or Firm*—Sughrue, Mion, Zinn, Macpeak & Seas

[57] ABSTRACT

A jointing box for optical fiber cables comprises two generally funnel-shaped flanges having an internal profile matching the external profile of the sheath jointing the ends of the cables and the cable ends themselves. At least one heat-shrink material tube is shrunk onto the flanges. The flanges have peripheral grooves on their larger diameter end part around the sheath and their smaller diameter end part around the parts of the cables adjacent the sheath. Each heat-shrink material tube is coated on its inside surface with a sealing material which fills the grooves on the flanges.

5 Claims, 1 Drawing Sheet

JOINTING BOX FOR OPTICAL FIBER CABLES

BACKGROUND OF THE INVENTION

1. Field of the invention

The present invention concerns a jointing box for optical fiber cables. It applies more particularly to repeaterless jointing of optical fiber undersea cables.

2. Description of the prior art

The document GB-A-2 192 732 describes in particular a device for protecting an optical fiber splice executed in a splice tube or sheath. This device comprises two substantially funnel-shape protection tubes threaded beforehand over the ends of the two fibers to be jointed, the larger diameter end part of each covering the adjacent end part of the splice tube. It further comprises a shrinkable sleeve covering the larger diameter end parts of the two protection tubes which surround the sheath without touching each other.

Until now an optical fiber cable joint has been protected by placing around the ends of the cables to be united and the jointing sheath a mold into which a thermoplastic material is injected. This process is relatively time-consuming, however, and the jointing and test equipment is costly and bulky.

An object of the present invention is to provide a cable jointing box providing a joint resistant to external water pressure and providing good mechanical protection of the joint but which is easier to use, faster to use and requires only simple and inexpensive equipment.

SUMMARY OF THE INVENTION

The present invention consists in a jointing box for optical fiber cables received over a sheath jointing two cables, comprising two flanges which are generally funnel-shaped, each having a larger diameter first cylindrical part and a smaller diameter second cylindrical part joined by an intermediate frustoconical part, inserted over the opposite end parts of said sheath, said flanges covering said sheath at least partially and surrounding the adjacent areas of said cables, on each respective side of said sheath, and comprising a first heat-shrink material tube shrunk onto the larger diameter first cylindrical part of the flanges and sealing means between the smaller diameter second cylindrical parts of the flanges and said cables, wherein said flanges are provided with peripheral circular grooves on the external surface of said first and second cylindrical parts, said first tube is coated on its inside surface with a sealing material and said sealing means comprise two second heat-shrink material tubes coated on their inside surface with sealing material and adapted to be shrunk onto the smaller diameter second cylindrical part of said flanges and onto said adjacent areas of said cables.

The flanges are preferably made of high-density polyethylene. Their larger diameter ends are nested one within the other.

The sealing material coating the inside of the heat-shrink tubes is advantageously bitumen. The peripheral grooves of said flanges are filled with sealing material by virtue of the material coated onto the inside of the tube flowing after they are shrunk.

A jointing box in accordance with the invention and the method of assembling it will now be described by way of example only and with reference to the appended drawing.

DETAILED DESCRIPTION OF THE INVENTION

Figure 1:
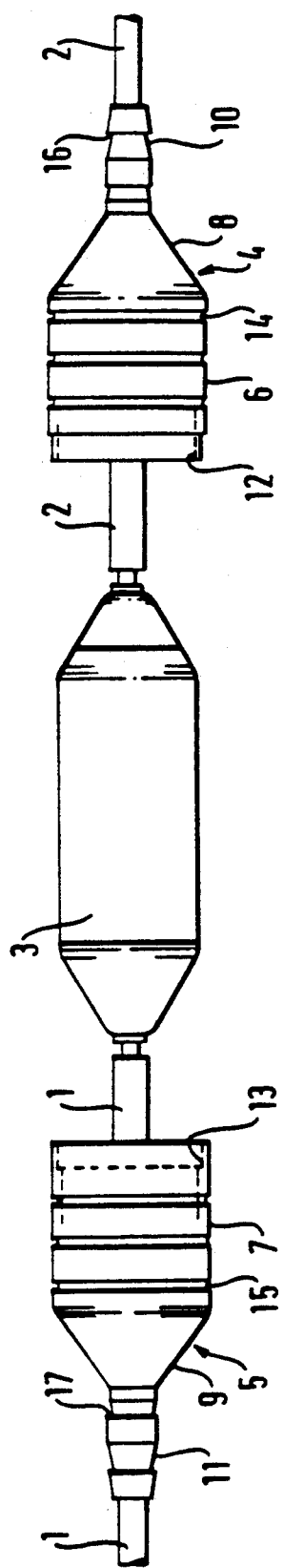
FIG. 1 shows the jointing box before the two flanges are nested.

Referring to FIG. 1, the cable ends 1 and 2 are united by the sheath 3. Over these ends are disposed the flanges 4, 5 respectively comprising a larger diameter part (6, 7) whose inside diameter matches that of the sheath, a frustoconical part (8, 9) and a smaller diameter part (10, 11), the inside diameter of which matches that of the cable ends. The flange 4 has a male end 12 adapted to be nested within the female end 13 of the flange 5. On the outside surface of the flanges are circular grooves 14, 15, etc in the case of the larger diameter part and 16, 18, etc in the case of the smaller diameter part.

Figure 2:
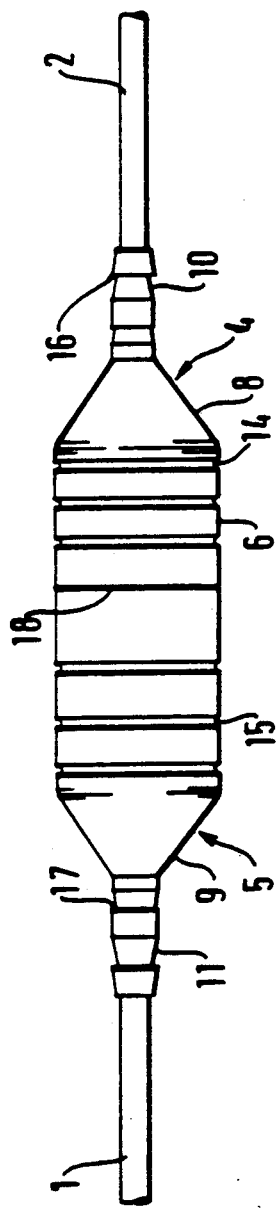
FIG. 2 shows it after they are nested, but before fitting the heat-shrink tube.

In FIG. 2 the flanges 4, 5 have been nested over the sheath 3 and join at a circle 18.

Figure 3:
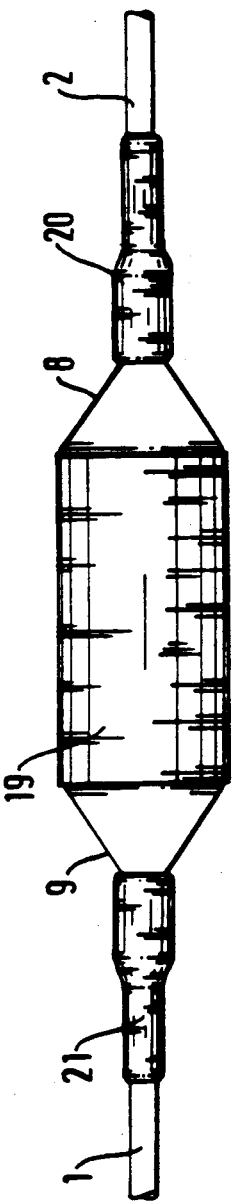
FIG. 3 shows it completed, after fitting and shrinking the heat-shrink tubes.

In FIG. 3 there has been disposed around the larger diameter cylindrical parts of the flanges a heat-shrink tube 19 made from high-flexibility polyolefin with a low shrinking temperature, such as the polyolefin marketed under the tradename "RT-102" by the RAYCHEM company, coated with bitumen on the inside. Disposed around their smaller diameter cylindrical parts are heat-shrink tubes 20 and 21 also coated internally with bitumen. These tubes have been heated to shrink them and to cause the bitumen to flow into the grooves on the cylindrical parts, providing an excellent seal even in the presence of high exterior water pressure.

There is claimed:

1. Jointing box for optical fiber cables received over a sheath jointing two cables, comprising two flanges which are generally funnel-shaped, each having a larger diameter first cylindrical part and a smaller diameter second cylindrical part joined by an intermediate frustoconical part, inserted over the opposite end parts of said sheath, said flanges covering said sheath at least partially and surrounding the adjacent areas of said cables, on each respective side of said sheath, and comprising a first heat-shrink material tube shrunk onto the larger diameter first cylindrical part of the flanges and sealing means between the smaller diameter second cylindrical parts of the flanges and said cables, wherein said flanges are provided with peripheral circular grooves on the external surface of said first and second cylindrical parts, said first tube is coated on its inside surface with a sealing material and said sealing means comprise two second heat-shrink material tubes coated on their inside surface with sealing material and adapted to be shrunk onto the smaller diameter second cylindrical part of said flanges and onto said adjacent areas of said cables.

2. Jointing box according to claim 1 wherein said flanges are made from high-density polyethylene.

3. Jointing box according to claim 1 wherein said sealing material on said heat-shrink tubes is bitumen.

4. Jointing box according to claim 1 wherein said flanges have a male bore and female bore adapted to nest one within the other at the ends of their larger diameter first cylindrical part.

5. Jointing box according to claim 1 wherein said peripheral grooves on said flanges are filled with sealing material as the result of the material coated onto the inside surface of said tubes flowing after they are shrunk.

* * * * *